United States Patent [19]
Huret et al.

[11] 3,896,679
[45] July 29, 1975

[54] BICYCLE DERAILER

[76] Inventors: Roger Henri Marius Huret; Jacques André Huret, both of 60, avenue Felix Faure, Nanterre (Hauts de Seine), France

[22] Filed: Nov. 19, 1973

[21] Appl. No.: 417,215

[30] Foreign Application Priority Data
Jan. 15, 1973 France .................... 73.01344

[52] U.S. Cl... 74/217 B; 74/242.11 B; 74/242.15 B; 74/242.14 B
[51] Int. Cl. ............................................ F16h 9/24
[58] Field of Search... 74/217 B, 242.15 B, 242.14 B, 74/242.11 B, 242.4; 280/236, 238

[56] References Cited
UNITED STATES PATENTS

| | | | |
|---|---|---|---|
| 3,364,762 | 1/1968 | Maeda | 74/217 B |
| 3,583,249 | 6/1971 | Morse | 74/217 B |
| 3,748,916 | 7/1973 | Morse | 74/217 B |

FOREIGN PATENTS OR APPLICATIONS

| | | | |
|---|---|---|---|
| 878,199 | 9/1961 | United Kingdom | 74/217 B |

OTHER PUBLICATIONS
"The Handbook of Cycl–ology," 6th edition, 1973, p. 153.

*Primary Examiner*—Samuel Scott
*Assistant Examiner*—Allan R. Burke

[57] ABSTRACT

The invention relates to a bicycle derailer comprising a chain-guide roller and a chain-tensioning roller mounted rotatively on spindles carried by a cover-frame, a spindle receiving said cover-frame pivotally and a spring fastened to the cover-frame in order constantly to tend to make it pivot and maintain the driving chain under tension, a means for controlling the movement of the cover-frame parallel to the axle of the free wheel of the bicycle and passing the driving chain from one pinion of this wheel to another, and is characterized in that the pivot spindle of the cover-frame is mounted on a means controlling the movement of the cover-frame parallel to the axle of the free wheel, by means of a support constituting a means of guiding the free movement of the pivot spindle of the cover-frame toward and away from the axle of the free wheel.

7 Claims, 9 Drawing Figures

3,896,679

BICYCLE DERAILER

The invention relates to a bicycle derailer by means of which the driving chain passes accurately and rapidly from one pinion of the free wheel to another, whatever the difference in the number of teeth and therefore the difference in the diameter of the various pinions of the free wheel might be.

Attempts have always been made to mount free wheels, having pinions of diameters differing as much as possible, as rear wheels of bicycles, so that the driving speed of the bicycle be very different, depending on the pinion of the free wheel that is used.

However, when free wheels with pinions with greatly differing diameters are used, the chain-guide roller of the derailer is too far away from the pinion with the smallest diameter of the free wheel to enable it to pass rapidly and accurately from this pinion with the smallest diameter to the next pinion.

Modifications were then made to derailers to the effect that when the chain-guide roller is moved parallel to the axle of the free wheel, the chain-guide roller simultaneously and positively moves also in a plane parallel to the axle of the free wheel, so as to shorten the length of the chain located between the free-wheel pinion in use and the chain-guide, whatever the pinion used.

However, all these known derailers do not always allow the chain to pass from one pinion to the next sufficiently rapidly and accurately, for the reason that the length of the chain located between the pinion in use and the chain-guide roller, is always too great. In addition, this type of derailer is of complex and even fragile construction.

The particular object of this invention is to overcome these disadvantages and, to that end, it relates to a bicycle derailer comprising a chain-guide roller and a chain-tensioning roller mounted rotatively on spindles carried by a cover-frame, a spindle receiving said cover-frame pivotally and a spring fastened to the cover-frame, in order constantly to tend to make it pivot and maintain the driving chain under tension, a means for controlling the movement of the cover-frame parallel to the axle of the free wheel of the bicycle and passing the driving chain from one pinion of this wheel to another, which derailer is characterized in that the pivot spindle of the cover-frame is mounted on the means controlling the movement of the cover-frame parallel to the axle of the free wheel, by means of a support constituting a means of guiding the free movement of the pivot spindle of the cover-frame toward and away from the axle of the free wheel.

According to another characteristic feature of the invention, the pivot spindle of the cover-frame is common to the rotary spindle of the chain-guide roller.

According to another characteristic feature of the invention, the spring is placed around the pivot spindle of the cover-frame and fastened by one of its ends to the cover-frame, and by its other end to a support point, the angular position of which is constant with respect to the pivot spindle of the cover-frame.

The invention is illustrated, by way of non-limitative example, in the following drawings in which.

In the accompanying drawings, the derailer according to the invention is shown fitted to a bicycle, the free wheel 1 of which is shown provided with five pinions of different diameters $1_1$, $1_2$, $1_3$, $1_4$ and $1_5$, as well as the driving chain, which bears the reference $2_1$ when it is placed on the free wheel pinion $1_5$ with the smallest diameter, and reference $2_2$ when it is placed on the free wheel $1_5$ with the largest diameter.

Figure 1:
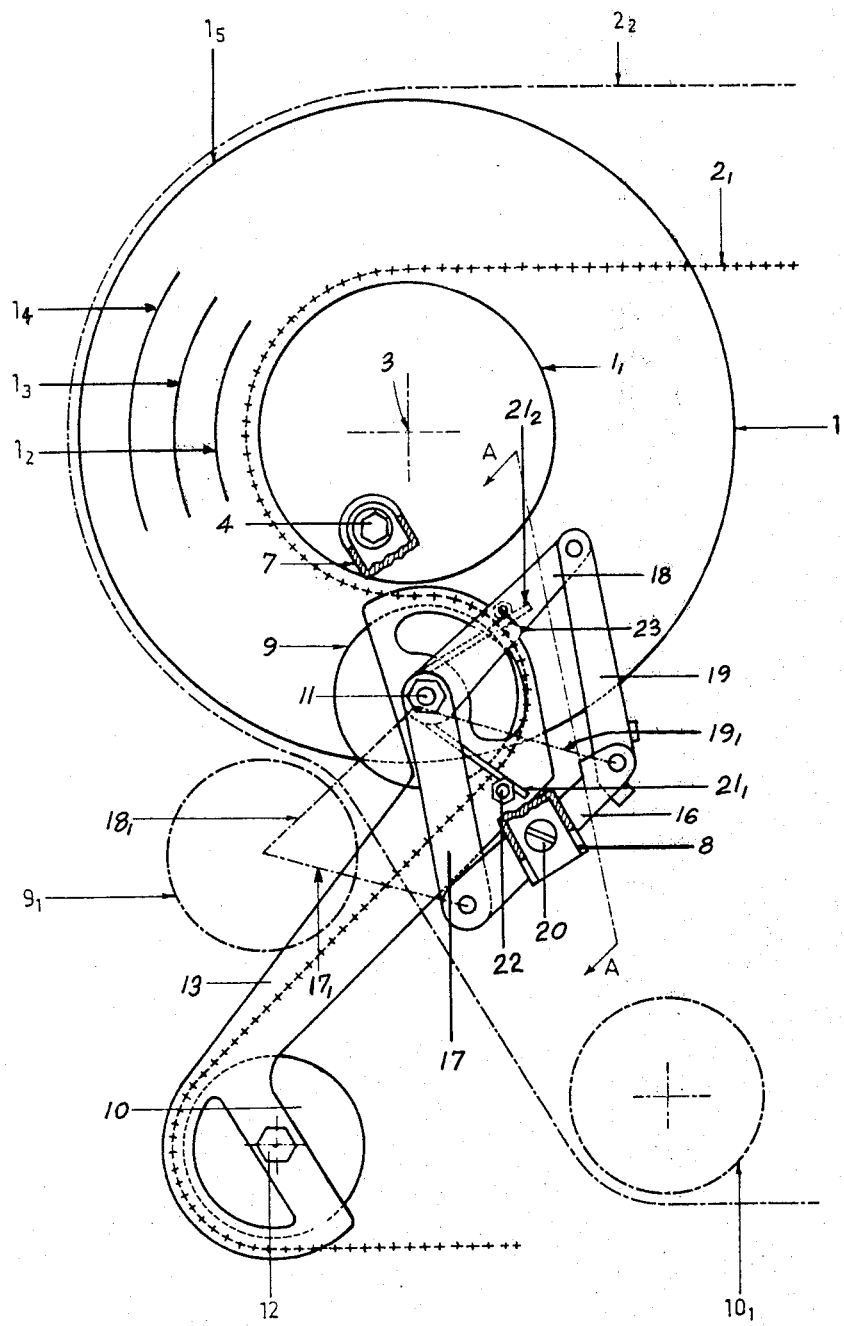
FIG. 1 is a schematic side view of one embodiment of the derailer according to the invention, with the cable-controlled deformable parallelogram removed.

This free wheel has an axle 3 placed perpendicularly to the plane of the FIG. 1, this axle being common to that of the hub of the rear wheel of the bicycle.

The frame of the bicycle has not been shown in these figures in order to simplify the drawing but only the screw 4 which fastens the derailer to the lug of the fork of the bicycle frame, in the known manner.

In addition, in all the accompanying drawings, the mechanism which moves the derailer roller parallel to the axle of the free wheel consists of a deformable parallelogram. It will nevertheless be understood that the means used to move the derailer rollers parallel to the axle of the free wheel can be of any type, since, as will be seen hereafter, these means are completely different from the devices which move the chain-guide roller toward or away from the pinions of the free wheel.

Figure 2:
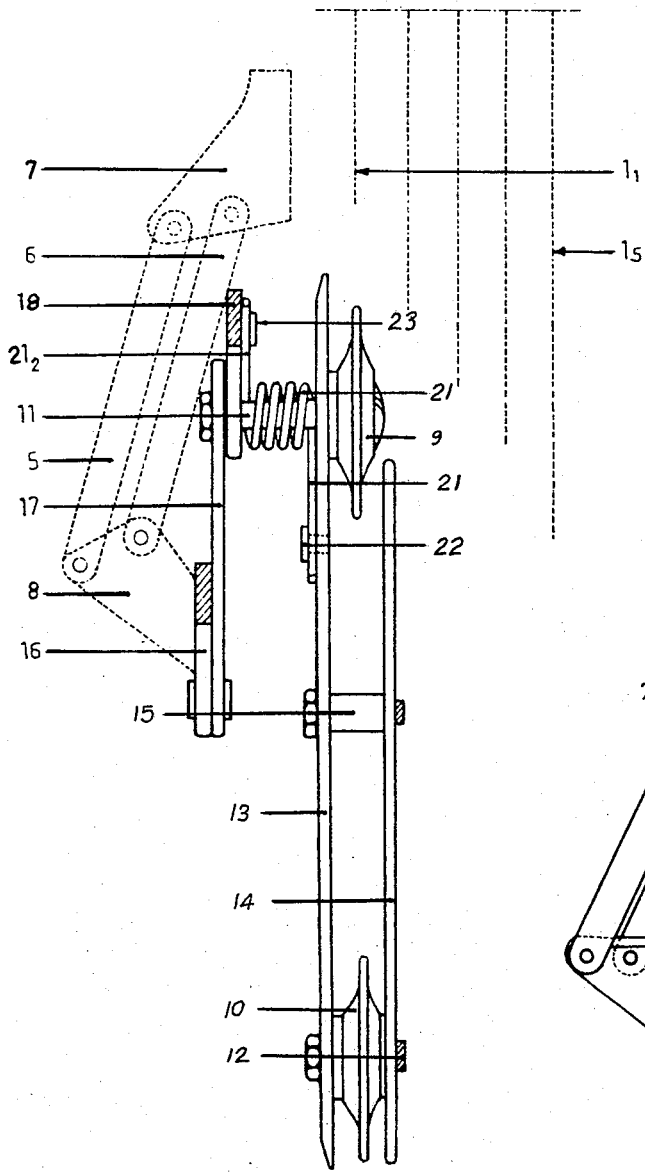
FIG. 2 is a sectional view along A—A in FIG. 1, showing the cable-controlled deformable parallelogram in dotted lines.

In FIGS. 1 and 2, the deformable parallelogram which moves the chain-guide roller parallel to the axle of the free wheel, comprises two opposite arms 5 and 6, hinged by their ends on the two parts 7 and 8 defining the other two opposite sides of this deformable parallelogram. The part 7 is fixed, by the screw 4, to the lug of the fork of the bicycle, while the part 8 accommodates all the other mechanical parts of the derailer.

As is known, the deformable parallelogram 5, 6, 7 and 8 is deformed by a cable (not shown), controlled by a handle fixed on the frame of the bicycle.

This derailer, in addition, includes, as is known, a chain-guide roller 9 and a chain-tensioning roller 10, mounted rotatively on the spindles 11, respectively 12, these spindles being carried by a cover-frame consisting of two blades 13 and 14 with a cross-piece at 15.

In the example of embodiment shown in the accompanying drawings, the spindle of the chain-guide 9 extends beyond the plate 13 of the cover-frame and constitutes at the same time the pivot spindle of this cover-frame.

According to the invention, the spindle 11 receiving the cover-frame 13–14 pivotally is connected to the part 8 of the deformable parallelogram by a support which constitutes a means of guiding the free movement of the pivot spindle 11 of the cover-frame toward and away from the axle 3 of the free wheel.

It will be understood therefore that, according to the invention, the cover-frame 13–14, as well as the rollers 9–10, are mounted loosely on the part 8 and that there is no mechanical means positively controlling the movement of this cover-frame and these rollers when the chain passes from one pinion of the free wheel to another. In the examples of embodiment in FIGS. 1 and 2, this support is constituted by a deformable parallelogram consisting of four arms or sides 16, 17, 18 and 19, the side 16 of which being fixed to the part 8 by the screw 20.

In the example of embodiment shown, the spindle 11 of the chain-guide roller 9, forming the fulcrum pin of the cover-frame 13–14, concurrently forms a joint for the arms 17 and 18 of this deformable parallelogram.

The chain-tensioning spring tending constantly to make the cover-frame 13–14 pivot, so that the roller 10 permanently exerts a tension on the chain $2_1$ or $2_2$, is constituted by a spring 21, preferably a spiral spring, one end $21_1$ of which is fastened at 22 to the plate 13 of the cover-frame, and of which the other end $21_2$ is fastened at 23 to the arm 18 of the deformable parallelogram.

It is therefore seen clearly that in the derailer according to the invention, no mechanical means are provided to maintain the cover-frame 13–14 and the rollers 9–10 in position and in particular that no means are provided to control the roller 9 approaching one or other of the pinions $1_1$ to $1_5$. Thus, in the absence of a driving chain, the parallelogram tends to deform under the action of the weight of the rollers 9 and 10 and the cover-frame 13–14. On the other hand, when the chain is placed in position on the free wheel and on the rollers 9–10 of the derailer, the chain is maintained constantly under tension by the spring 21 and by means of the cover-frame 13–14 and of the chain-tensioning roller 10, so that the chain itself constantly exerts a reactive force tending to reduce its tension. But this reactive force has a possibility of acting on the deformable parallelogram, by means of the rollers 9–10, so that, constantly, the tension of the chain, determined by the spring 21, tends to move the chain-guide roller 9 toward the pinion of the free wheel over which the chain passes, in order constantly to tend to reduce the tension of the chain. Moreover, this reduction in tension is automatically compensated for by the pivoting movement of the tension roller 10, under the action of the spring 21.

FIG. 1 thus shows the two extreme positions of the rollers 9 and 10. In the position of these rollers shown by solid lines, the chain, in its position 2, passes over the pinion with the smallest diameter $1_1$, and then over the rollers 9–10, the length of the chain located between the chain-guide roller 9 and the pinion 1, being the smallest possible.

When, by means of a traction cable, the user acts upon the deformable parallelogram 5, 6, 7, 8 to move the cover-frame 13–14 parallel to the axle 3, the parallelogram 16, 17, 18, 19 deforms freely, since it is not mechanically controlled, so that the arms 17, 18 and 19 can move to occupy the positions shown by the broken lines at $17_1$, $18_1$ and $19_1$, the chain-guide roller 9, in that case, occupying the position $9_1$ in which the chain, located in position $2_2$ meshes with the teeth of the pinion $1_5$. In that case, the chain-tensioning roller 10 occupies the position $10_1$ in order to compensate for the increase in the diameter of the pinion from the pinion $1_1$ to the pinion $1_5$.

FIGS. 3 to 7 show one actual embodiment of a derailer corresponding to that in FIGS. 1 and 2. In these figures, the same parts bear the same references. It will be noted, however, that in FIGS. 1 and 2, the plate 13 of the cover-frame is mounted pivotally on the fulcrum pin 11 located between the arms 17 and 18 of the parallelogram, while in the FIGS. 3 to 7, the plate 13 and the roller 9 are mounted on the spindle 36 constituting the joints of the arms 18 and 19 of the parallelogram. This arrangement enables the arms 18 and 19 of the parallelogram to be given a mean horizontal position varying between the low position in FIG. 6 to the high position in FIG. 7, so that the vertical force engendered by the chain and transmitted to the cover-frame by means of rollers, creates an optimum couple, taking the arms of the lever into account.

Figure 9:
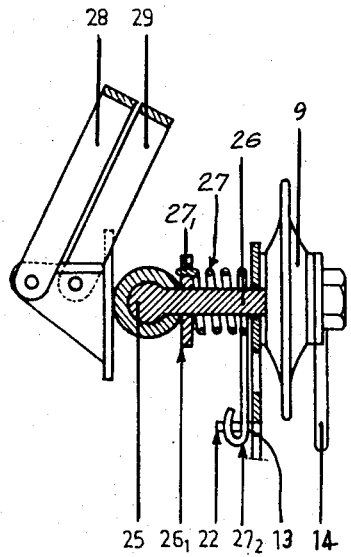
FIG. 9 is a sectional view along B—B in FIG. 8.
Figure 3:
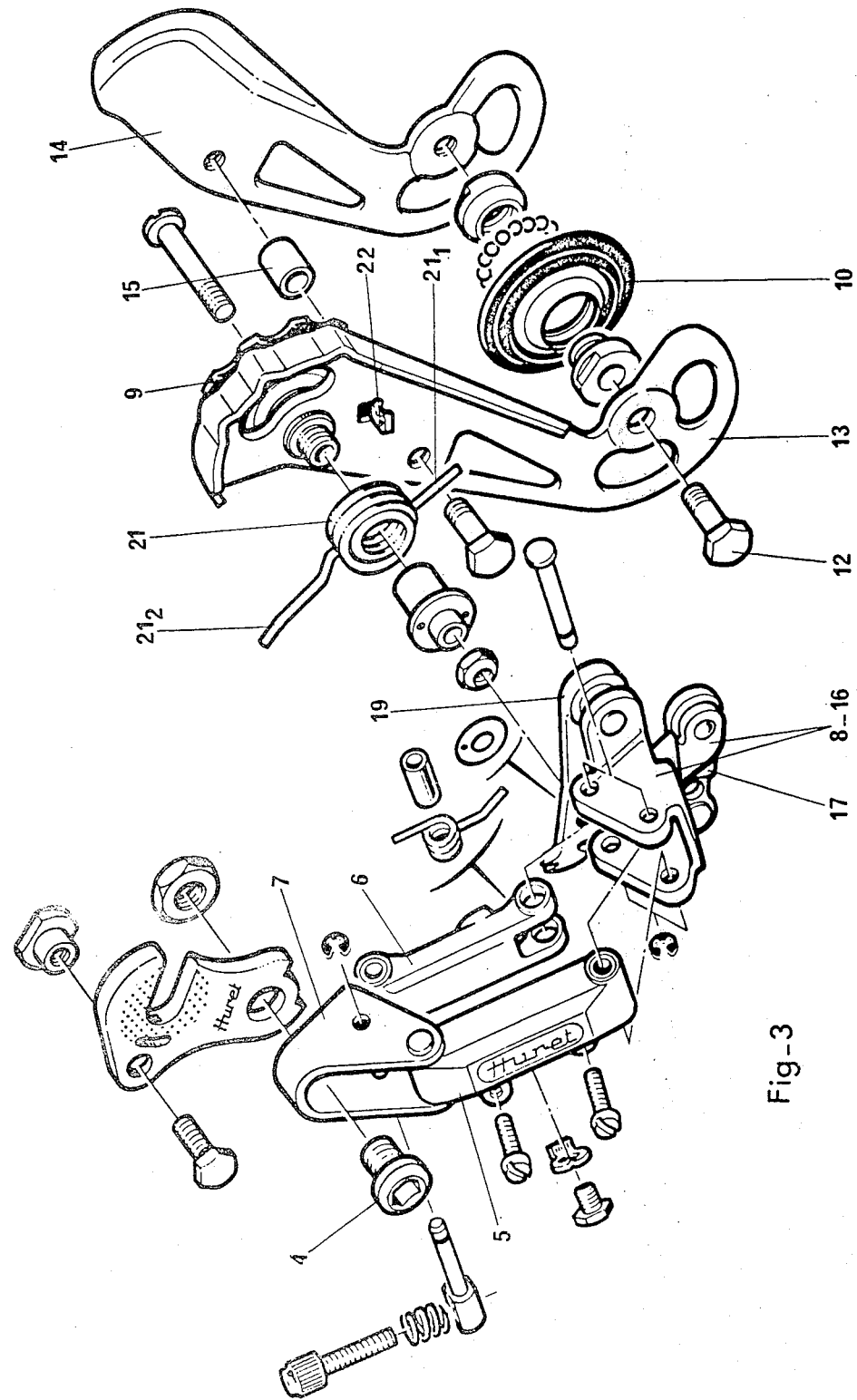
FIG. 3 is an exploded view of one embodiment of the derailer of FIGS. 1 and 2.
Figure 5:
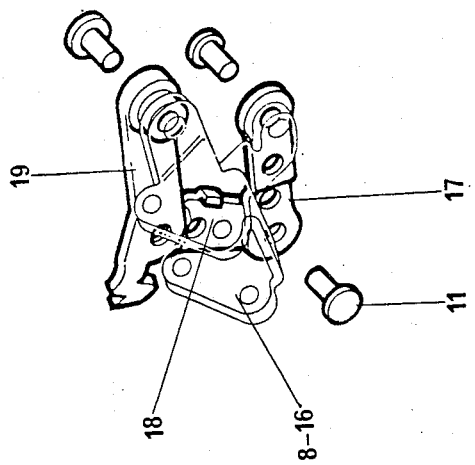
FIGS. 4 and 5 are elevation and perspective views of the parallelogram which moves the chain guide toward and away from the free wheel.
Figure 4:
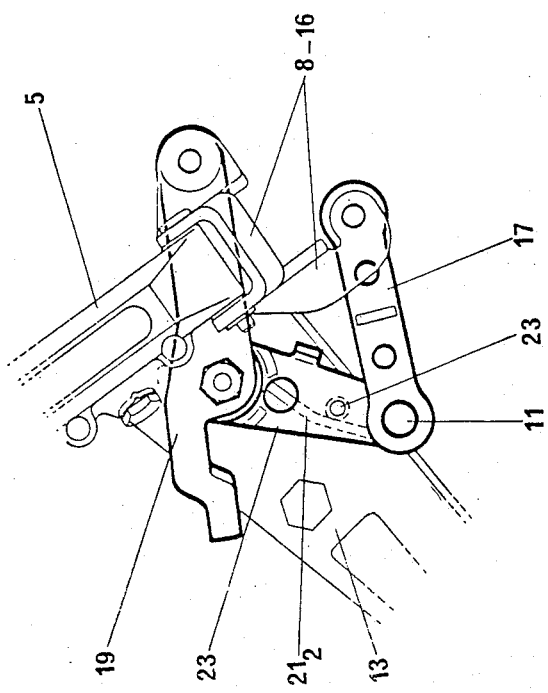
Figure 7:
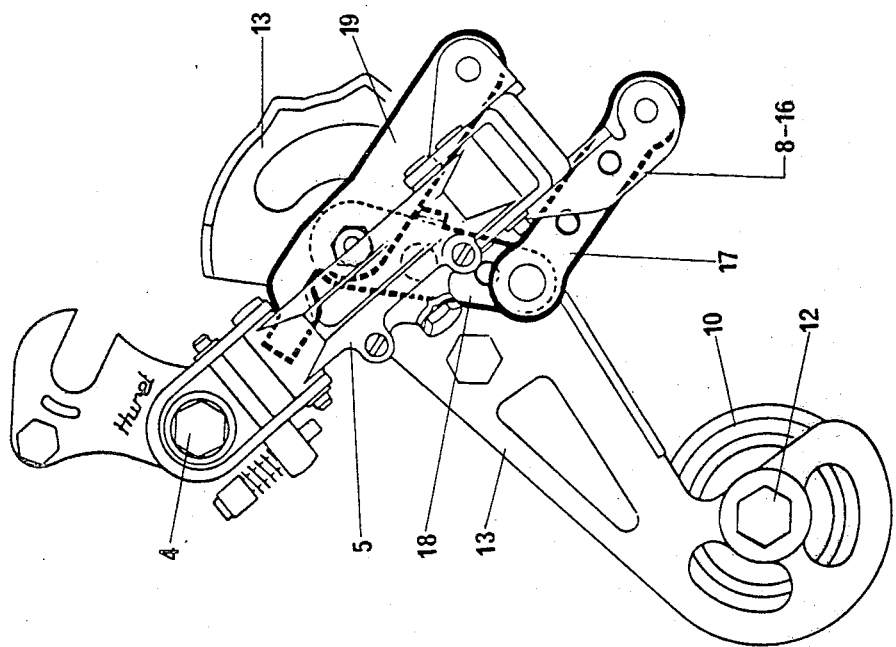
FIGS. 6 and 7 show the two extreme positions of the derailer of FIGS. 3 to 5, FIG. 6 representing the derailer when the chain is placed on a large diameter pinion of the free wheel, and FIG. 7 representing the derailer when the chain is placed on a small diameter pinion.
Figure 6:
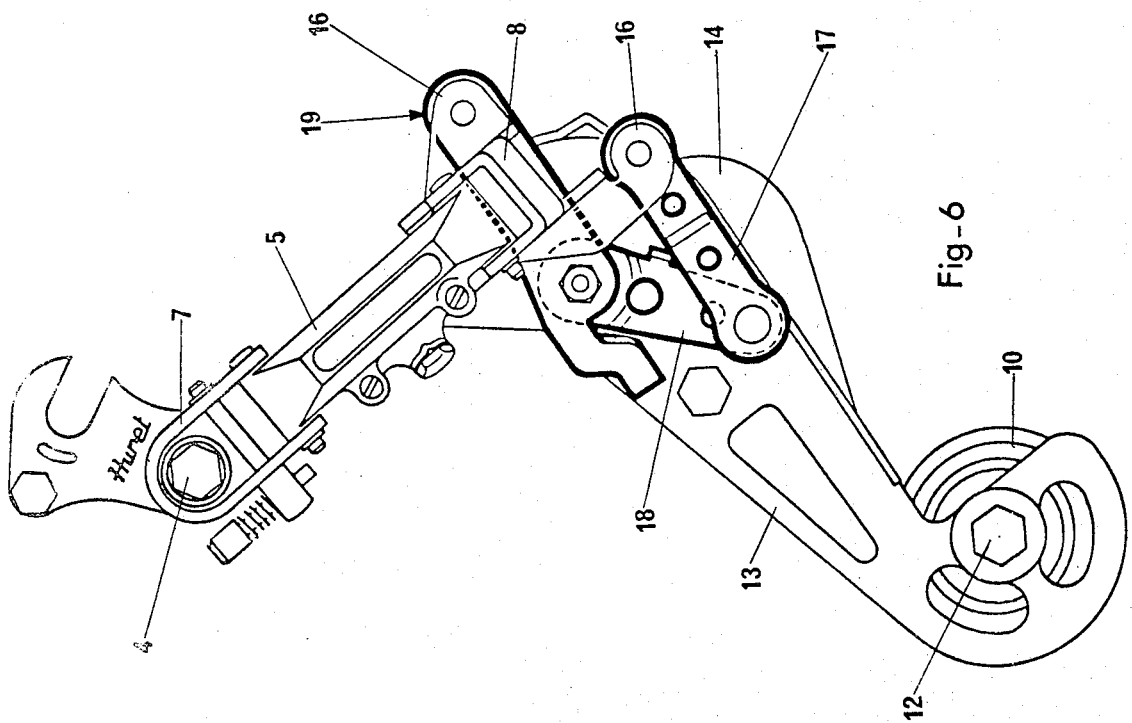
Figure 8:
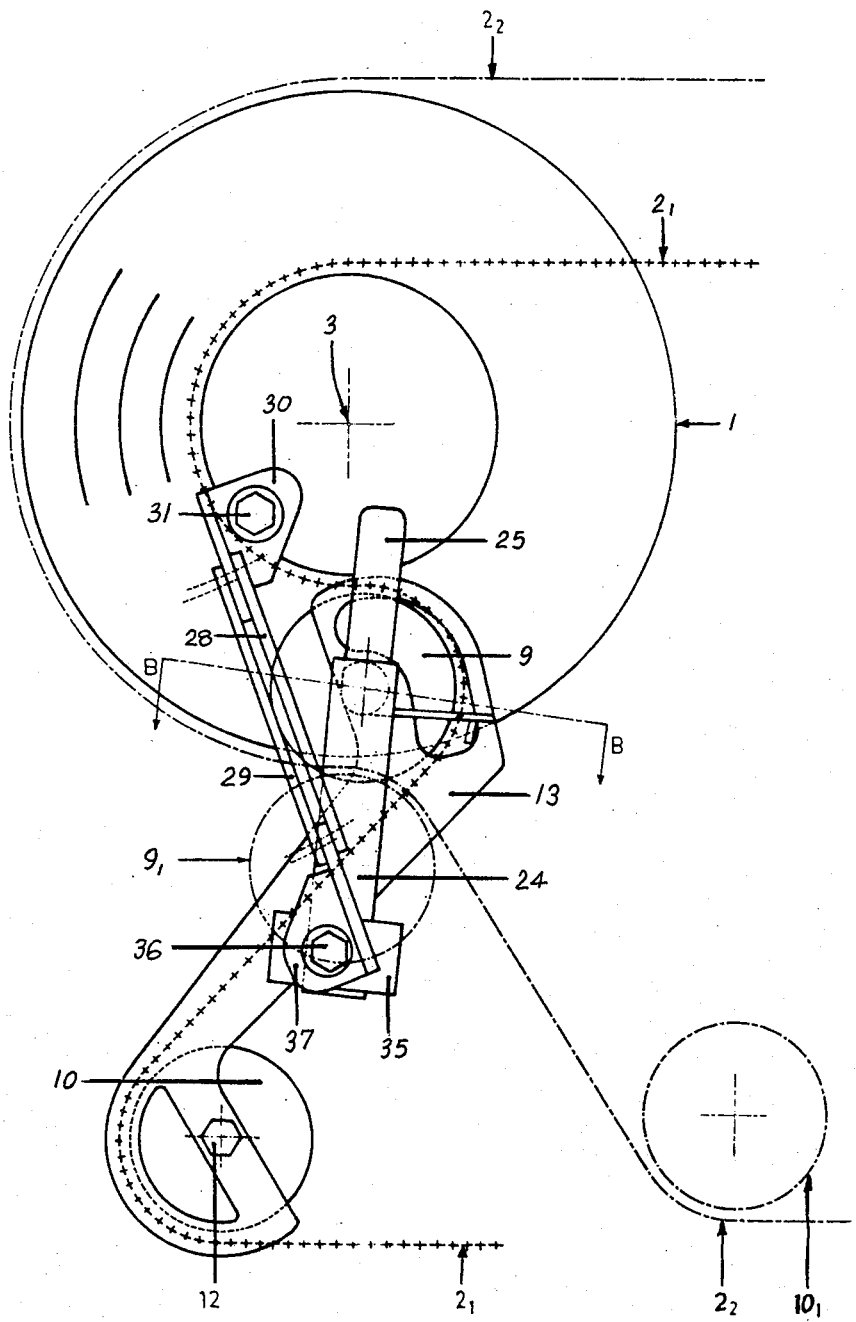
FIG. 8 is a side view of another embodiment of the derailer according to the invention.

In the example of embodiment in FIGS. 8 and 9, another guide means is provided to enable the pivot spindle to move freely toward or away from the axle of the free wheel. Thus in that case this support is constituted by a slide block 24 receiving a freely sliding slide piece 25, the slide block 24 being integral with the plate 35 and fixed to the part 37 by a screw 36. This part 37 defines one of the sides of the deformable parallelogram of which the other three sides are constituted by the arms 28 and 29 and by the upper part 30 fixed, by means of the screw 31, to the lug of the rear fork of the frame of the bicycle. The slide block 24 constitutes, in the example shown, of a tube split along one of its generatrices while the slide piece 25 is constituted by a cylindrical spindle, on which is rigidly fixed the end of the spindle 26, rotatively receiving the chain-guide roller 9, and pivotally, the plate 13 of the cover-frame 13–14. This spindle 26, around which is placed the chain-tensioning spring 27, comprises a flange $26_1$, provided with a perforation through which passes one of the ends $27_1$ of the spring 27. Moreover, the other end $27_2$ of this spring 27 is fastened at 22 to the plate 13 of the cover-frame 13–14.

It will also be noted that in this example of embodiment, no particular control means are provided for moving the chain-guide roller 9 toward the pinion, of the free wheel 1, in use. Thus, in the absence of the driving chain $2_1$–$2_2$, the slide piece 25, because of its own weight and the weight of the cover-frame 13–14 and that of the rollers 9, 10, slides downward inside the slide block 24. On the other hand, when the chain is in position, the spring 27, by making the cover frame 13–14 pivot, exerts a tension, by means of the roller 10, on the chain and this chain automatically engenders a reactive force which tends to reduce the tension on the chain by moving the roller 9 toward the pinion in use of the free wheel 1. Under these conditions the chain length located between the pinion in use and the chain-guide roller 9, is always minimal, whatever the diameter of this pinion. Under these conditions also, the change of speed obtained by the driving chain passing from one pinion to another of the free wheel is effected rapidly and accurately, whatever the difference in the diameter of these pinions might be.

It is obvious that the invention is not limited to the examples of its embodiment hereinabove described and illustrated and that on the basis of these other variants of it can be envisaged without departing from the scope of the invention.

What we claim is:

1. A derailer for a bicycle including a driving chain and a free wheel having an axle and an associated plurality of pinions operable to receive said driving chain, comprising a chain-guide roller and a chain-tensioning roller mounted rotatively on spindles carried by a cover-frame, a spindle receiving said cover-frame pivotally and a spring fitted to the cover-frame tending constantly to make it pivot and maintain the driving chain under tension, a control means for controlling the movement of the cover-frame essentially parallel to the axle of the free wheel of the bicycle and for passing the driving chain from one pinion of this wheel to another, the pivot spindle of the cover-frame being mounted on said control means by support means for guiding the free movement of the pivot spindle of the cover-frame toward or away from the axle of the free wheel in a plane essentially perpendicular to said axle in each position of a plurality of positions of the cover frame along the direction essentially parallel to said axle.

2. A bicycle derailer according to claim 1, in which the spindle of the cover-frame is common to the spindle of the chain-guide roller.

3. A derailer according to claim 1, in which the spring is placed around the pivot spindle of the cover frame and is fastened by one of its ends to the cover-frame and by its other end to a support point, the angular position of which is constant with respect to the pivot spindle of the cover frame.

4. A derailer according to claim 1, in which the support means comprises a deformable parallelogram fixed, by one of its sides, to the control means and mounted by an opposite side, on the pivot spindle of the cover-frame, the chain-tensioning spring placed around the pivot spindle of the cover-frame being fastened, on one end, to the cover-frame, and on the other end, to said opposite side of the deformable parallelogram.

5. A derailer according to claim 4, in which the deformable parallelogram is diamond shaped.

6. A derailer according to claim 2, in which the support means comprises a deformable parallelogram, one of whose vertices has a fulcrum pin, the spindle of said cover frame being common to said fulcrum pin.

7. A derailer according to claim 1, in which the support comprises a slide block accommodating a slide piece, the slide block being fixed to the control means, the slide piece being fixed to the pivot spindle of the cover-frame and the chain-tensioning spring, placed around the pivot spindle of the cover-frame, being fastened, on one end, to the cover frame, and on the other end, to the slide piece.

* * * * *